United States Patent [19]

Takada

[11] 4,278,216
[45] Jul. 14, 1981

[54] DOUBLE-SAFETY EMERGENCY LOCKING BELT RETRACTOR

[76] Inventor: Juichiro Takada, 3-12-1, Shinmachi Setagayaku, Tokyo, Japan

[21] Appl. No.: 107,132

[22] Filed: Dec. 26, 1979

[30] Foreign Application Priority Data

Apr. 19, 1979 [JP] Japan .................................. 54-47237
Jun. 27, 1979 [JP] Japan .................................. 54-87040

[51] Int. Cl.³ ........................ A62B 35/02; B65H 75/48
[52] U.S. Cl. ........................ 242/107.4 A; 242/107.4 B
[58] Field of Search .................. 242/107.4 R–107.4 E; 280/806; 297/478, 480

[56] References Cited

U.S. PATENT DOCUMENTS

| | | | |
|---|---|---|---|
| 2,843,335 | 7/1958 | Hoven et al. | 242/107.4 B |
| 3,979,083 | 9/1976 | Fohl | 242/107.4 B |
| 4,077,585 | 3/1978 | Wiesbock | 242/107.4 B |
| 4,185,792 | 1/1980 | Weman | 242/107.4 B |

Primary Examiner—John M. Jillions
Attorney, Agent, or Firm—Brumbaugh, Graves, Donohue & Raymond

[57] ABSTRACT

A double-safety emergency locking belt retractor for vehicle safety belt systems comprises an improved automatic-locking mechanism in which an axially movable latch disc locks the reel to the retractor frame upon rotation of the reel relative to an inertia wheel in the belt-unwinding direction. Such relative motion occurs when an inertia-sensitive device stops rotation of the inertia wheel in response to acceleration of the vehicle at from about 0.3 g to about 0.7 g or the inertia of the wheel causes it to lag the reel when the belt is accelerated at about 0.7 g or higher. The latch and inertia wheel are cammed axially apart upon such relative rotation, the inertia wheel being locked to a cover for certainty of cam function and the latch disc thereupon being locked to the frame.

13 Claims, 17 Drawing Figures

DOUBLE-SAFETY EMERGENCY LOCKING BELT RETRACTOR

The present invention relates to belt retractors for use in vehicle occupant restraint belt systems and, in particular, to retractors of the so-called emergency locking type which ordinarily permit the belt to be pulled from the reel but which are locked in the event of an abrupt change in the velocity of the vehicle such as occurs in a collision or upset of the vehicle.

BACKGROUND OF THE INVENTION

Among the many types of emergency locking retractors which have been proposed over the years are those which respond to a rapid pulling out of the belt, such as that which occurs when the occupant of the vehicle is thrown forward in a collision, an upset or an abrupt stop. This type of retractor generally includes an inertia wheel which rotates with the belt reel when the belt is pulled out relatively slowly but which lags behind the belt reel when the belt is pulled out rapidly. The inertia wheel ordinarily works in conjunction with springs which assist in maintaining a relative position between the belt reel and the inertia wheel up to some selected rate of rotation. When the selected rate of rotation is exceeded, the rotational inertia of the inertia wheel produces the lag between the inertia wheel and the belt reel. Some sort of mechanism associated with the inertia wheel responds to the lag in the rotation of the inertia wheel by locking the belt reel against rotation.

With this type of retractor the attainment of relatively great sensitivity in the mechanism, which is desirable to lock the reel against pullout of the belt when the speed at which the occupant is thrown forward is relatively low, results in the tendency for the mechanism to lock the reel when the occupant is simply pulling the belt out in the process of hooking it up. Similarly, the locking caused by a sensitive mechanism may occur during operation of a passive belt system which automatically moves the belt between a restraining configuration and releasing configuration. To overcome the inconvenience of undesired locking, it has been necessary to lessen the sensitivity of the inertia mechanism, which has meant that the retractor does not lock in the absence of a relatively rapid pullout. In general the belt-pullout sensitive types of retractors have been constructed to lock only when the passenger is thrown forward with an acceleration of about 0.7 g or higher.

The above-described problem with belt-pullout sensitive retractors has led to the development of retractors which lock not only in response to rapid pullout of the belt but to an inertia-detecting device, such as a pendulum type of device, which detects a rapid change in velocity of the vehicle, or, to be more precise, the inertia detecting device itself. Several types of so-called "double safety" locking systems which use both a belt-pullout sensitive system and an inertia detecting device to lock the reel have been proposed and commercialized. Examples of the double safety belt retractors are described and shown in U.S. Pat. Nos. 3,958,774, 4,109,881 and 3,897,024 (reissued as U.S. Pat. No. 29,594), the last of which is owned by the assignee of the present invention.

Generally, the double safety type belt retractors that have been commercialized have been judged adequate from the functional point of view. However, they have, depending on the particular one in question, a variety of disadvantages such as mechanical complexity involving a relatively large number of parts, difficulty and, therefore, high cost of assembly, unduly large size, or unduly high weight.

SUMMARY OF THE INVENTION

There is provided, in accordance with the present invention, a vehicle restraint belt retractor of the double-safety type which uses relatively few parts, which is comparatively easy to assemble, is of comparatively low cost, and is relatively small and of light weight. It is also highly sensitive, preferably providing for locking at accelerations as low as 0.3 g.

More particularly, an emergency locking belt retractor, according to the present invention, comprises a frame having spaced-apart side members and a reel mounted between the side members of the frame for rotation. A portion of the reel shaft extends out beyond one of the side members of the frame, and a flange is secured to the shaft portion adjacent the side member for rotation with the reel. The flange has a multiplicity of circumferentially spaced-apart latch-receiving notches. A latch disc is received on the shaft adjacent and outwardly of the flange for movement toward and away from the flange and has a multiplicity of circumferentially spaced-apart latch teeth which project toward and through the latch notches of the reel flange. The side frame member adjacent the reel flange includes locking shoulders corresponding to and selectively engageable by the latch teeth on the latch disc. When the latch teeth move into engagement with the locking shoulders, the latch disc and the flange on the belt reel are locked to the side frame member and prevent rotation of the reel in the belt pullout direction.

A latch spring normally urges the latch disc away from the reel flange and into engagement with an inertia wheel received on the shaft portion (preferably on a collar fitted over the shaft portion) adjacent and outwardly of the latch disc, relative to the side frame member, for both rotation and axial movement on the shaft. The inertia wheel and latch disc include cooperating cams and cam followers which are shaped such that the inertia wheel and latch disc can be held by latch and inertia wheel springs relatively close to each other as long as they rotate in unison but are moved away from each other upon rotation of the latch disc in the belt unwinding direction relative to the inertia wheel, i.e., when the inertia wheel rotation lags that of the latch disc. A cap member is fastened to the retractor frame and has a wall portion adjacent and outwardly from the inertia wheel. The inertia wheel and cap end portion have locking ratchet teeth which are selectively engageable upon outward axial movement of the inertia wheel by the cams and, when engaged, prevent rotation of the inertia wheel in the direction of belt unwinding. An inertia wheel spring urges the inertia wheel in a direction away from the cap end portion and toward the latch disc. Thus, the latch spring and inertia wheel spring normally urge the latch disc and inertia wheel toward each other so they rotate together without the latch teeth engaging the locking shoulders on the frame side member. Upon rapid acceleration of the reel in the belt unwinding direction, the inertia wheel lags behind the latch disc and is cammed outwardly and locked to the cap, whereupon the latch disc is cammed away from the inertia wheel and toward the side frame and the latch teeth engage the latch shoulders on the side frame to prevent further unwinding of the belt reel.

In addition to the above described mechanism which locks the reel in response to rapid pullout of the belt, the retractor includes an inertia responsive device for stopping rotation of the inertia wheel in response to an abrupt change in velocity of the retractor, preferably in any direction. Stopping of rotation of the inertia wheel in response to the inertia device has the same effect of camming the inertia wheel and latch disc away from each other upon slight unwinding rotation of the reel so that the locking teeth on the latch disc lock the reel to the frame and prevent rotation of the reel in the belt pullout direction.

In a preferred embodiment, the inertia responsive device includes a pawl which is selectively engageable with any one of a series of transverse ratchet teeth on the inertia wheel which have shoulders facing in the direction of belt unwinding rotation for engagement by the pawl. A pendulum or other inertia responsive element responds to an abrupt change in the velocity of the retractor to engage the pawl with the ratchet teeth on the inertia wheel.

It is also desirable that the retractor of the present invention include the following further features:

1. The force of the inertia wheel spring should be substantially less than the force of the latch spring so that when the latch disc rotates relative to the inertia wheel in the belt unwinding direction, the inertia wheel is first pushed out so that it locks to the cap member (by means of the locking ratchet teeth) and only after such locking is the latch member cammed inwardly to lock the reel against rotation.

2. The cam and cam follower preferably comprise a circular row of circumferentially spaced-apart cam follower slots on either the latch disc or the inertia wheel and cam teeth having oblique camming edges on the other of the latch disc and the inertia wheel, the cam teeth being received in the slots with the cam edges working to cam the latch disc and inertia wheel apart when the rotation of the inertia wheel lags that of the latch disc in the belt unwinding direction.

3. The locking means preferably includes circular rows of circumferentially spaced-apart, mutually engaging shoulders on opposed surfaces of the inertia wheel and cap end portion, such shoulders being portions of the aforementioned ratchet teeth.

4. The camming arrangement between the latch disc and the inertia wheel is designed so that the camming action ceases as soon as the tips of the locking ratchet teeth on the inertia wheel and the tips of the latch teeth on the latch disc are apart longitudinally by a distance equal to the distance between the cap end and the bases of the locking shoulders on the frame side member in order that a small additional rotation of the reel and latch disc to attain full locking of the latch teeth does not result in additional longitudinal movement of the inertia wheel toward the cap end.

5. To ensure that a retractor having the feature described in paragraph 4 above is unlatched (after having been latched) when the belt is to be rewound onto the reel, it is advantageous to provide releasing ratchet teeth on the opposed surfaces of the inertia wheel and the end portion of the cap and which are both radially and circumferentially offset from and face in directions opposite to the locking ratchet teeth. Accordingly, the releasing teeth engage and stop rotation of the inertia wheel in the belt-winding direction and ensure reversing of the cams on the latch disc and inertia wheel when the reel rotates in the winding direction.

For a better understanding of the invention and for a description of additional aspects, reference may be made to the following description of exemplary embodiments, taken in conjunction with figures of the accompanying drawings.

DESCRIPTION OF EXEMPLARY EMBODIMENTS

The embodiment of the invention shown in FIGS. 1 to 4 comprises a frame 20 made by bending a blank of heavy metal sheet into a generally "U"-shape, thus to provide a cross portion 22 and a pair of laterally spaced-apart side members 24 and 26. A belt reel 28 is mounted for rotation in the side frame members 24 and 26 by means of bushings 30 and 32 received in holes 34 and 36 in the frame side members. The end of an occupant restraint belt B is fastened to the reel, and the reel is spring-loaded to rotate in a belt-winding direction, as indicated by the arrowed line W, by a spring assembly which comprises a retainer disc 38, a spiral spring 40 and a cap 42 assembled and secured to the outer face of the frame side member 24. A tab 40a on the inner end of the spring 40 is received in a slot 28a on the end of the reel 28, and a tab 40b on the outer end of the spring 40 is received in a slot 42a in the cap, the spring being installed with a preload to wind a desired length of the belt B onto the reel 28 and provide a predetermined force that tends always to wind the belt onto the reel 28.

Figure 1:
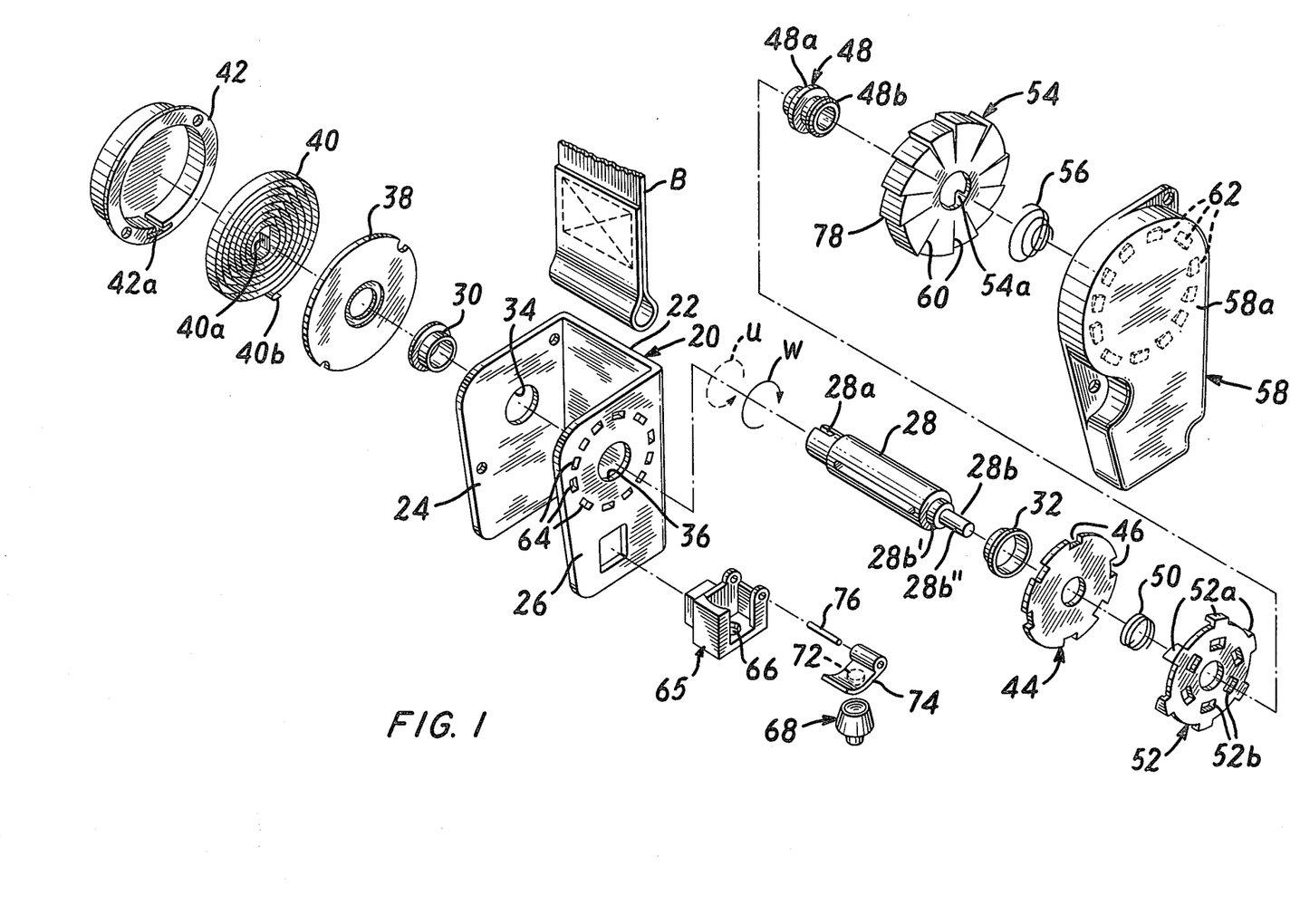
FIG. 1 is an exploded pictorial view of one embodiment of the invention.
Figure 2:
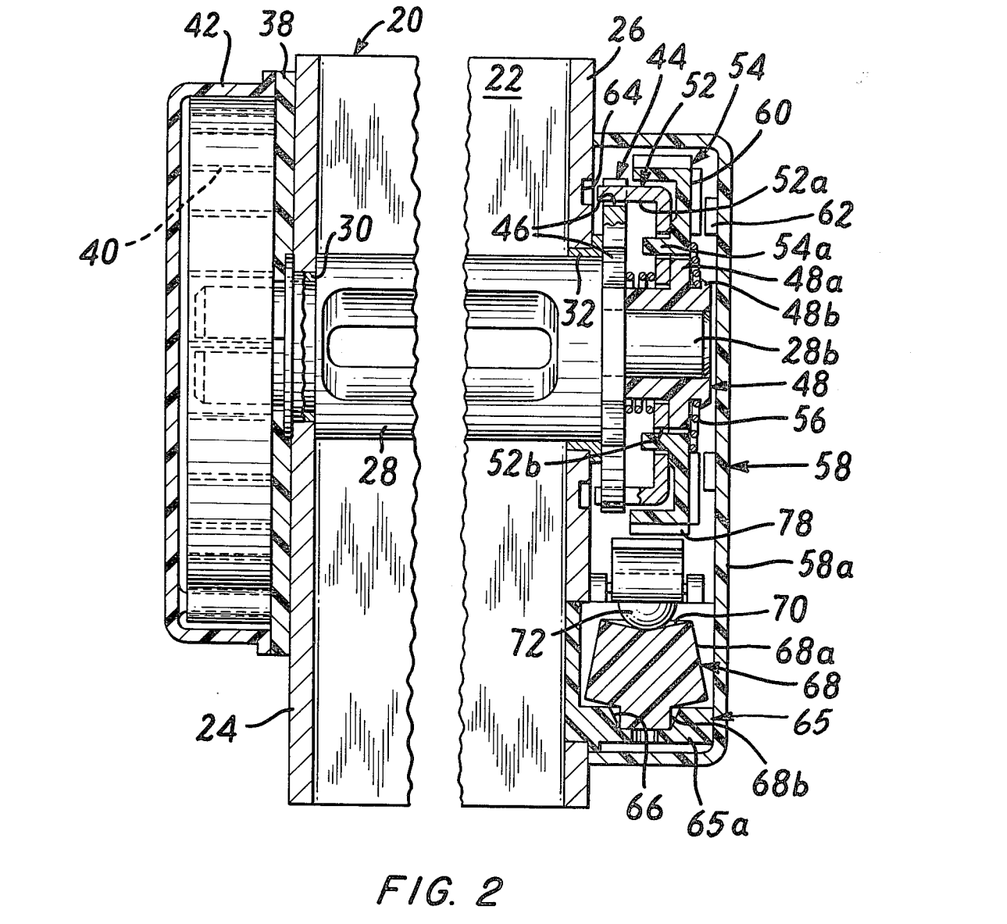
FIG. 2 is an end cross-sectional view of the embodiment of FIG. 1, the center portions of the reel and frame being broken away and the retractor being shown with the double-safety latch arrangement unlocked.

The belt reel 28 includes a shaft portion 28b that projects outwardly from the frame side member 26 and receives, first of all, a reel flange 44, the flange being secured to a larger diameter part 28b' of the portion 28b for rotation with the reel. The flange 44 has a number of latch-receiving notches 46 spaced-apart equally from each other along its perimeter. A lesser diameter part 28b" of the shaft portion 28b receives a collar 48, the inner end of which bears against the outer face of the reel flange 44. Moving in a direction outwardly from the reel flange 44, the following components are received on the collar 48: a latch spring 50; a latch disc 52; an inertia wheel 54; and an inertia wheel spring 56. The latch disc 52 is received on the collar 48 inwardly of a stop flange 48a with sufficient clearance between the hole in the center of the latch disc 52 and the collar to permit free axial movement of the latch disc on the collar. The latch spring 50 is compressed between the reel flange 44 and the latch disc 52 and, accordingly, normally urges the latch disc 52 outwardly against the stop shoulder 48a on the collar 48. The latch disc 52 includes a multiplicity of circumferentially spaced-apart, generally longitudinally extending latch teeth 52a. Each such latch tooth 52a passes through a corresponding notch 46 in the reel flange 44. Accordingly, the latch disc 52 always rotates with the reel 28 and the reel flange 44, but is capable of moving axially relative to the reel and the frame 26.

Figures 3A, 3B:
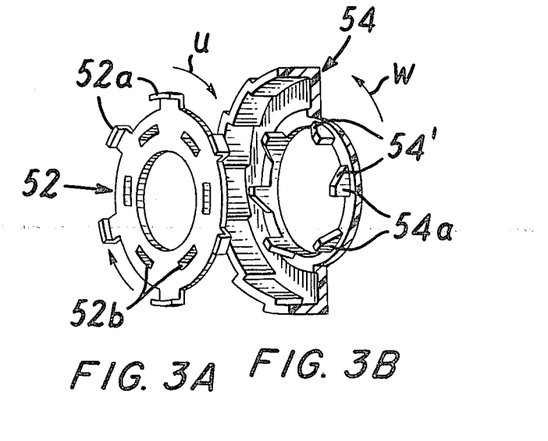
FIGS. 3A and 3B are schematic pictorial representations of the latch disc and the cam portion of the inertia wheel of the embodiment shown in FIGS. 1 and 2.

The inertia wheel 54 is supported for axial movement and rotation on the circumferential edge of the stop flange 48a of the collar 48. An inertia wheel spring 56 urges the inertia wheel axially toward the latch disc 52, the spring 56 being retained on the outer portion of the collar 48 by a retainer flange 48b. As shown in FIG. 3B of the drawing, the inertia wheel 54 has a circumferential row of spaced-apart, generally longitudinally extending cam teeth 54a, each of which extends into a corresponding cam slot 52b in the latch disc 52. An inclined camming edge 54' on each cam tooth 54a works against a cam follower edge of the cam slot to move the latch disc 52 and the inertia wheel 54 away from each other upon rotation of the latch disc in the belt-unwinding direction relative to the inertia wheel (the belt-unwinding direction of rotation being represented in the drawings by the arrowed lines designated by the letter U).

When the belt B is unwound from the reel, whether by a passenger who is applying the belt, by a passive system which pulls out the belt to move it to a releasing configuration, or pull-out of the belt when the passenger is thrust forward in an emergency situation, the reel 28, the reel flange 44 and the latch disc 52 rotate in the belt-unwinding direction (the arrowed lines U) as a unit as long as the belt is pulled from the reel at less than a certain acceleration, which is a matter of the design of the system and is preferably about 0.7 g. Under such relatively low acceleration of the belt B in the unwinding direction, the latch spring 50 and the inertia wheel spring 56 urge the latch disc 52 and the inertia wheel 54 toward each other and maintain them in the position illustrated in FIG. 2 of the drawings in which the latch disc 52 is held outwardly relative to the side frame member 26 so that the latch disc freely rotates with the latch teeth in clearance with the outer wall of the side frame member 26 and the inertia wheel 54 is held inwardly, relative to the end wall portion 58a of a cover 58 which fits over the latch assembly and is suitably fastened to the side frame member 26.

When the belt reel 28 is accelerated above about 0.7 g in the unwinding direction, the inertia of the inertia wheel 54 causes the rotation of the inertia wheel to lag the rotation of the latch disc 52 and the reel 28. Upon such relative rotation of the latch disc and the inertia disc 54 the cam teeth 54a on the inertia wheel 54 work against the cam follower edges of the cam slots 52b on the latch disc 52 and move the inertia wheel 54 and latch disc away from each other in the axial direction (relative to the axis of the reel 28).

The movement apart of the latch disc 52 and the inertia wheel 54 occurs in the following sequence, which is assured by providing an inertia wheel spring 56 with substantially less force output than that of the latch disc spring 50. FIG. 2 (the unlatched condition) and FIG. 4 (the latched condition) should be compared to facilitate an understanding of the operation of the retractor. The initial camming action between the cam teeth on the inertia disc and cam slots on the latch disc moves the inertia wheel 54 outwardly toward the end wall 58a of the cap 58. Upon such outward movement of the inertia wheel 54, sets of locking ratchet teeth 60 on the outwardly facing surface of the inertia wheel 54 and complementary ratchet teeth 62 on the inner surface of the end wall portion 58a of the cap 58 engage and stop rotation of the inertia wheel 54 in the belt unwinding direction (the dashed arrowed line U in the drawings). As soon as the inertia wheel stops rotating, further camming action between the cam teeth 54a on the inertia wheel and the cam slots 52b on the latch disc 52 moves the latch disc axially (relative to the shaft axis) toward the frame side member 26 against the force of the latch spring 50 and ultimately engages the latch teeth 52a on the latch disc 52 with a circumferential row of indentations 64 embossed in the side member 26 and having locking shoulders facing against the direction of rotation of the latch disc 52 in the unwinding direction U. The configurations and locations of the cam teeth and cam slots and the locations of the ratchet teeth 60 and 62 are so related to the locations of the locking shoulders of the indentations 64 in the side frame as to ensure register and locking action resulting from the above-described sequence of movements and actions of the locking assembly.

Engagement between the latch teeth 52a and the locking indentations 64 prevents further rotation of the latch disc 52 in the belt-unwinding direction. Inasmuch as the latch teeth extend through the notches 46 in the reel flange 44, the belt reel 28 is prevented from further rotation in the pull-out direction. Accordingly, the belt B is locked against further withdrawal from the reel and restrains the vehicle occupant from being thrown forward.

As soon as the forces on the belt which caused the retractor to lock in the manner described above cease and the belt is thus allowed to rewind slightly under the influence of the spring 40 in the winding direction (the solid arrowed line W) the above-described sequence of action of the locking assembly is reversed. The rotation of the flange 44 on the belt reel in the winding direction rotates the latch disc 52 in the winding direction. The tips of the locking teeth 52a lie oblique to the plane of the frame side member 26 and assist the latch spring 50 in pushing the latch disc outwardly. Meanwhile, rotation of the latch disc in the winding direction W disengages the camming edges of the cam teeth 54a from the cam slots 52b of the latch disc 52 and allows the inertia wheel spring 56 to push the inertia wheel 54 back into the unlatched position illustrated in FIG. 2 of the drawing. Thus, the latching mechanism is restored to the unlocked condition in which the belt can freely be pulled out under moderate rates of acceleration and in which the mechanism is ready for emergency locking in the manner described above.

In addition to locking in response to rapid acceleration of the belt and the consequent rapid rotational acceleration of the reel 28, the embodiment shown in FIGS. 1–4 of the drawings also includes an inertia-responsive locking device which responds to rapid acceleration of the vehicle more precisely, the part of the vehicle where the inertia sensitive device is located. The inertia sensitive device comprises a small casing 65 fitted to the side frame member 26 of the frame 20 and having on its bottom wall 65a a seat 66 having a flat bottom and conical side walls. A mass 68 having a body portion 68a and a base portion 68b rests in the seat 66. In the absence of predetermined acceleration of the device in any direction in a generally horizontal plane, the mass 68 rests in an upright position in which the base portion 68b lies with its flat lower surface seated fully on the flat upper surface of the seat 66. At some predetermined acceleration of the device, preferably about 0.3 g, the inertia of the mass causes it to rock or tilt about some point at the circular edge of the flat lower surface of the base portion 68b, thus lifting the body portion. A dish-like camming surface 70 on the top of the mass engages a generally spherical cam follower projection 72 on the underside of a pawl 74. One end of the pawl 74 is mounted by means of a pivot pin 76 on the upper corner of the case 65. Accordingly, a combination of a camming action of the surface 70 working against the follower 72 on the pawl and the lifting motion of the mass 68 pivots the pawl upwardly about the pivot pin 76 so that the tip of the pawl is brought into engagement with one of a series of ratchet teeth 78 located on the circumferential surface of the inertia disc 54.

When the pawl 74 engages one of the ratchet teeth 78 on the inertia disc, rotation of the inertia disc 54 is prevented. Meanwhile, if the belt B is pulled out, thereby rotating the reel 28 and the latch disc 52 in the unwinding direction (the arrowed line U in FIG. 1) relative to the then latched inertia disc, the cam teeth 54a on the inertia wheel 54 work against the cam slots 52b on the latch disc 52 and move the latch disc and inertia wheel axially apart in exactly the same way as occurs in operation of the latching mechanism in response to rapid pull-out of the belt and as is described in detail above to engage the latch teeth 52a in the latch notches 64 in the side member 26 of the frame and lock the belt reel against rotation in the unwinding direction.

The embodiment of the invention shown in FIGS. 5 to 14 of the accompanying drawings is similar in overall construction and mode of operation to the embodiment of FIGS. 1 to 4, but includes a number of refinements and modifications which offer certain advantages. The retractor includes a generally U-shaped frame 100 having a pair of spaced-apart side members 102 and 104 connected by a base member 106. A reel 108 is mounted for rotation in bushings 110 and 112 which are installed in holes 114 and 116 in the respective frame side members 102 and 104. A winding spring assembly consisting of a retainer disc 118, a spiral spring 120 and a cover 122 is mounted on the outside face of the side member 104 and, in the manner described in connection with the embodiment of FIGS. 1 to 4, drives the belt reel 108 in the direction indicated by the arrowed lines W in the drawings to wind a restraint belt B onto the reel but yields to allow the belt B to be withdrawn from the reel with rotation in the direction of the arrowed lines U.

Figures 4, 6:
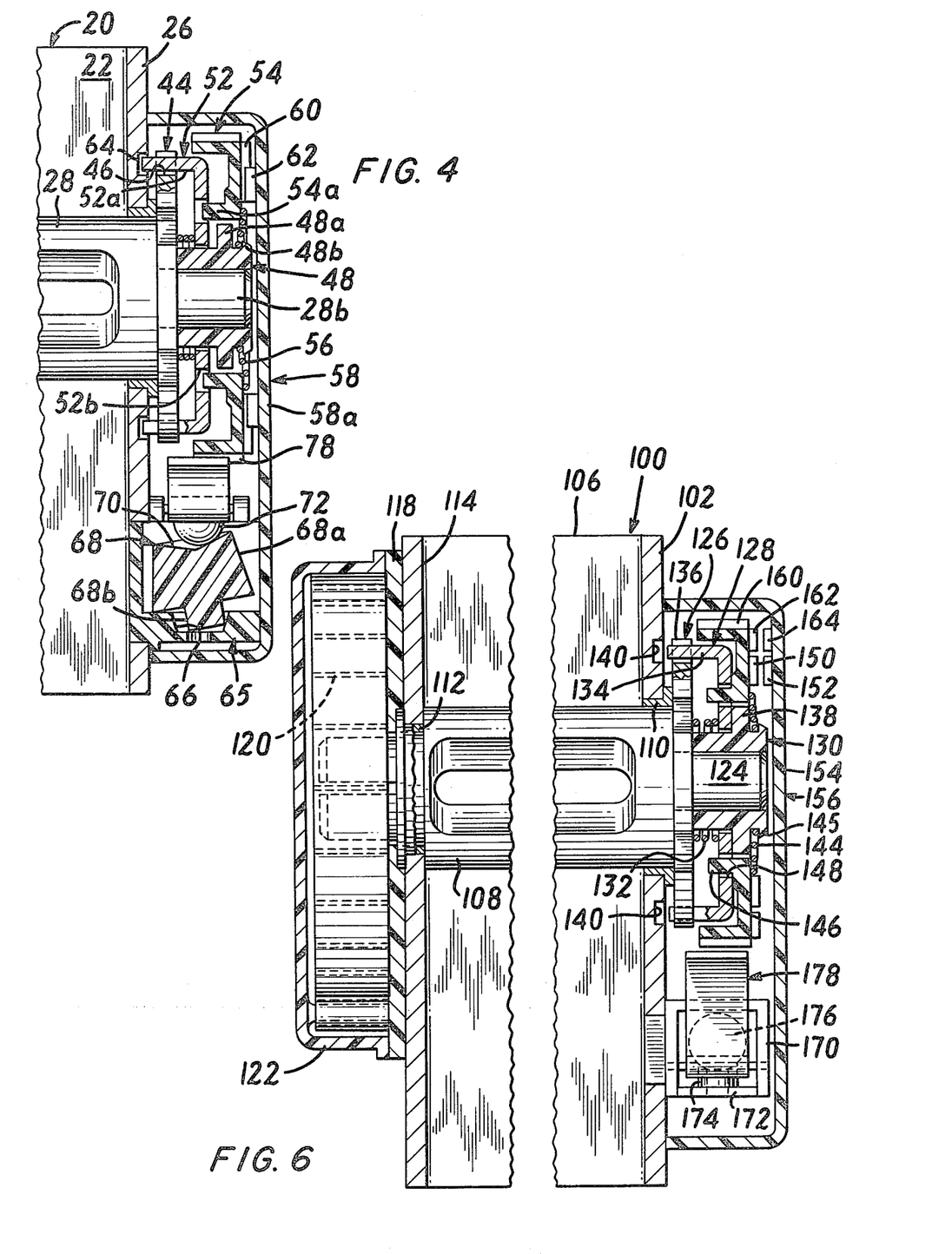
FIG. 4 is a partial end cross-sectional view of the embodiment of FIGS. 1 through 3 showing the belt reel locked.
FIG. 6 is an end cross-sectional view of the retractor of FIG. 5 in which the center portion of the reel and frame are broken away and the retractor is unlocked.
Figure 5:
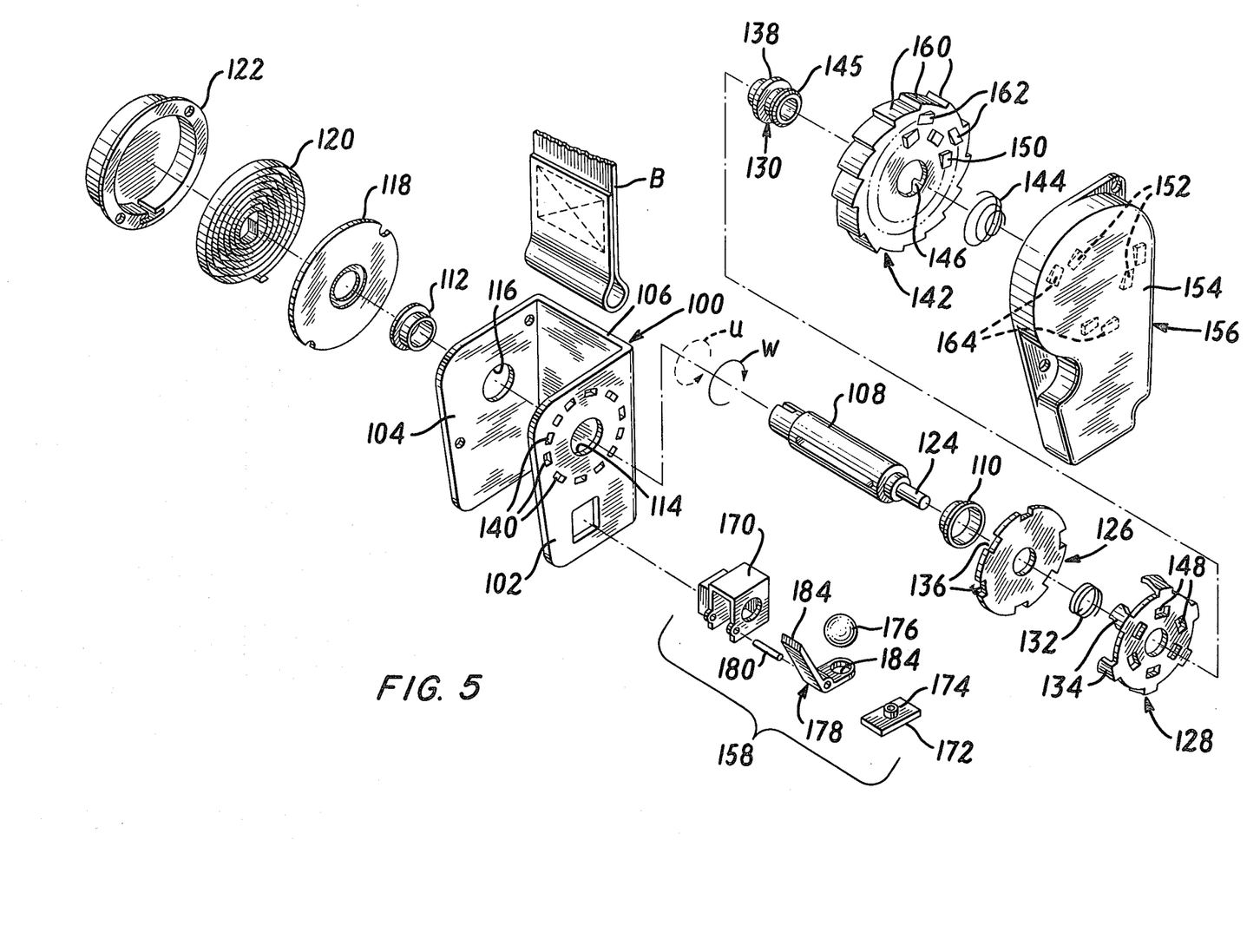
FIG. 5 is an exploded pictorial view of another embodiment of the invention.

The reel 108 includes a shaft portion 124 which projects out from the outer face of the frame side member 102 and to which a reel flange 126 is secured immediately adjacent to the side member 102. Adjacent the reel flange 126 is a latch disc 128 which is free to both rotate and move longitudinally on a sleeve 130 fitted to the shaft portion 124 and which is urged outwardly away from the flange 126 by a latch spring 132. The latch disc 128 has a multiplicity of (for example, six) equally circumferentially spaced-apart latch teeth 134 which extend through correspondingly located notches 136 at the perimeter of the flange 126. A stop flange 138 on the sleeve 130 establishes the outermost position of the latch disc 128 and in that position the tips of the latch teeth 134 remain clear of the outer face of the side member 102 of the frame 100 so that the latch disc is free to rotate with the flange 126 and the reel 108 in both the winding and unwinding directions. When the latch disc is cammed inwardly as described below (and as described in detail in connection with the embodiment of FIGS. 1 to 4) the tips of the latch teeth 134 move into engagement with a series (12, for example) of equally spaced locking shoulders defined by indentations 140 stamped in a circular row in the frame side member 102.

The sleeve 130 also carries an inertia wheel 142 which is urged toward the latch disc 128 by an inertia wheel spring 144 held in position by a spring retainer flange 145 on the sleeve 130. The inertia wheel 142 has a circular row of equally spaced-apart cam teeth 146, (e.g., six of them) which are received in correspondingly located cam slots 148 in the latch disc 128 and which are shaped to move the inertia wheel and latch disc away from each other upon rotation of the latch disc 128 relative to the inertia wheel 142 in the unwinding direction U. The inertia wheel moves outwardly (in the direction away from the frame) to bring certain ones of a number of (such as 12, but in all cases a number equal to the number of locking shoulders 140) equally spaced-apart locking ratchet teeth 150 on the outer face of the inertia wheel into engagement with companion locking ratchet teeth 152 (three such teeth are adequate) on the end wall 154 of a locking assembly cover 156. Meanwhile, the latch disc 128 moves inwardly toward the frame to engage the latch teeth 134 with the latching shoulders of the indentations 140, thereby locking the latch disc 128 to the retractor frame 100 and stopping rotation of the reel by way of the reel flange 126.

The retractor shown in FIGS. 5 to 14 also includes an inertia-responsive device designated generally by the reference numeral 158 which operates in conjunction with a series of equally spaced-apart ratchet teeth 160 (e.g., 12 such teeth) on the perimeter of the inertia wheel 142 in the manner described above.

As described thus far, the construction and mode of operation of the retractor shown in FIGS. 5 to 14 are substantially identical to those of the embodiment of the invention shown in FIGS. 1 to 4 as described above.

The modifications and refinements included in the present embodiment are described below.

Figure 7:
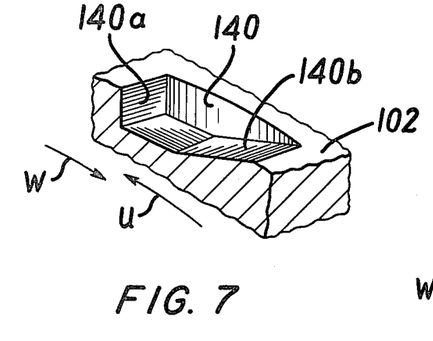
FIG. 7 is a fragmentary pictorial view showing the configuration of a latching shoulder on the side frame member of the embodiment of FIGS. 5 and 6.
Figure 8:
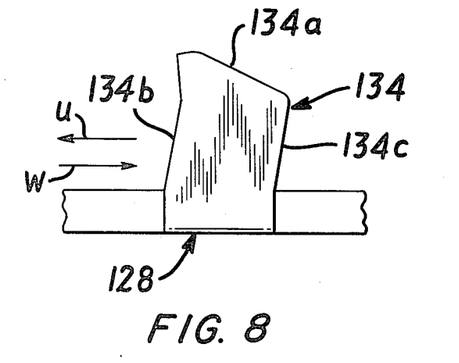
FIG. 8 is a fragmentary elevational view of a latch tooth on the latch disc of the embodiment of FIGS. 5 to 7.
Figures 9A, 9B:
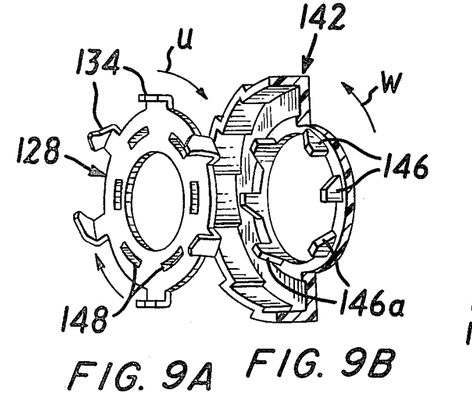
FIGS. 9A and 9B are schematic pictorial representations of the latch disc and the cam part of the inertia wheel of the embodiments of FIGS. 5 to 8.

Referring to FIG. 7, it is preferred that each of the indentations 64 and 140 in the frame side members 26 and 102 of both embodiments include a locking shoulder 140a which lies substantially perpendicular to the outer surface of the frame member 26 or 102 and facing against the direction of unwinding rotation U of the reel and the latch disc and that the base of the indentation include a portion 140b lying oblique to the surface of the member 102, the oblique portion 140b constituting an inclined cam surface sloping up in the direction of rotation of the reel and latch disc in the belt winding direction W. As shown in FIG. 8 each latch tooth 134 includes a tip 134a which in profile generally matches the profile of each indentation 140 into which it enters when the retractor is locked except that the extremity of each tip is narrower in the circumferential direction than the bottom of each indentation. Accordingly, the teeth are cammed out of the indentations 140 whenever the reel rotates in the belt winding direction W by engagement between the tips 134a of the teeth and the portions 140b of the indentations.

Figure 11:
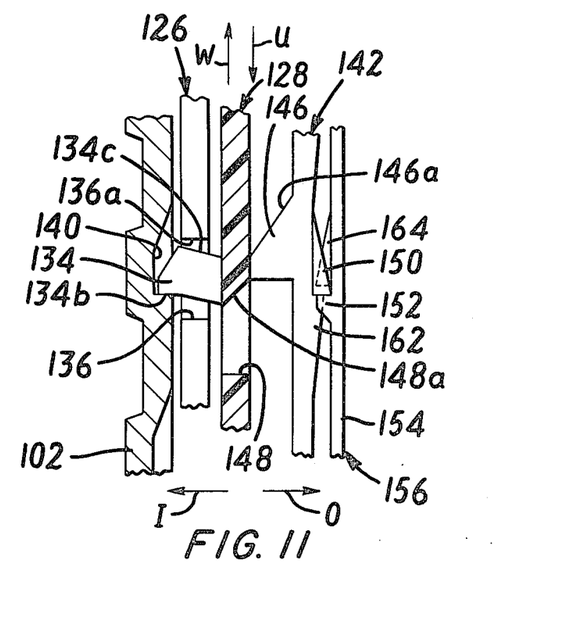
FIG. 11 is the diagrammatic view of the latch assembly in the locked condition.

With respect to rotation of the latch member in the unwinding direction U the leading edge 134b and the trailing edge 134c of each tooth are tilted slightly backward (see FIG. 8) as is apparent in FIG. 11; the slightly backward rake of each tooth 134 provides a slight camming action between the trailing edge 136a of each notch 136 in the reel flange 126 and the trailing edge 134c of each tooth 134 tending to push the tooth 134 inwardly to ensure full seating in the corresponding indentation 140 in the frame side member 102. Thus, the configuration of the latch teeth 134 is advantageous to certainty of locking action and ensures that any deformation or deflection of the reel flange 126 or the latch disc 128 will not tend to unseat the latch teeth from the locking indentations in the side member 102. Of lesser importance is a reverse camming action taking place between the leading edge of each tooth and the leading edge of each notch 136 in the winding direction tending to unseat the latch teeth from the indentations.

Figure 10:
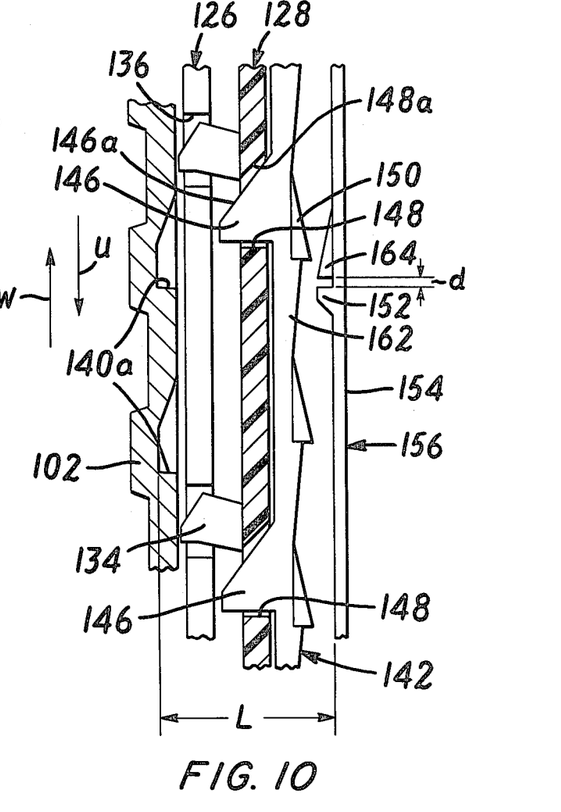
FIG. 10 is a diagrammatic view of the latch assembly shown in the unlocked condition.

As shown in FIG. 10 of the drawings, the trailing end 148a (relative to the unwinding direction) of each cam slot 148 in the latch disc 128 lies oblique to the face of the latch disc so that it generally matches in orientation the camming edge 146a of the corresponding cam tooth 146 on the inertia wheel 142 in order to ensure smooth camming action between, and minimum wear of, the cam slots 148 and the cam teeth 146.

Another desirable refinement of the retractor shown in FIGS. 5 to 14 involves the relationship between the distance L (see FIG. 10) and the axial and circumferential locations of the latch teeth 134 on the latch disc and the locking ratchet teeth 150 on the outer face of the inertia wheel when they are fully seated in locked positions, as shown in FIG. 11. In the embodiment of FIGS. 1 to 4, it is possible because of variations in the manufacture within tolerances of the parts or parts wear over the life of the retractor for the locking ratchet teeth 60 on the inertia wheel to be in full engagement with the locking ratchet teeth 62 on the cover wall member 58a while the tips of the latch teeth 52a touch the bases of the indentations 64 on the frame side member but are not in a rotational location for engagement with the locking shoulders. In this event further rotation of the reel flange and the latch disc in the unwinding direction U produces additional camming action between the camming elements of the inertia wheel and latch disc and though proper engagement of the latch teeth with the locking shoulders is attained, results in forced binding of and possible damage to the locking ratchet teeth or the cam elements. The embodiment of FIGS. 5 to 14 avoids this possibility by providing cam teeth 146 designed so that the camming action between the inertia wheel and the latch disc ends when the tips of the locking ratchet teeth 150 are located at a distance from the tips of the latch teeth 134 on the latch disc 128 substantially equal to the distance between the inner surface of the end member 154 and the bases of the locking indentations 140 in the frame member 102, i.e., the distances indicated by the line L in FIG. 10. In the latched condition (FIG. 11) the cam teeth 146 emerge from the cam slots 148 and ride a short distance along the face of the latch disc 128, as shown in FIG. 11.

It will be apparent from a close study of FIG. 11 that even though the tips of the locking ratchet teeth 150 and 152 are fully seated and the tips of the latch teeth 134 are in the full inward position at the end of the camming action, a slight additional rotation of the latch disc is required before the leading edge 134b of each latch tooth 134 engages the locking shoulder 140a of a locking indentation 140. This slight amount of rotation, which is intentionally provided for, makes it possible to relax the manufacturing tolerances, thus making manufacture and assembly more economical without in any way sacrificing reliability of operation.

Figures 12A, 12B, 13:
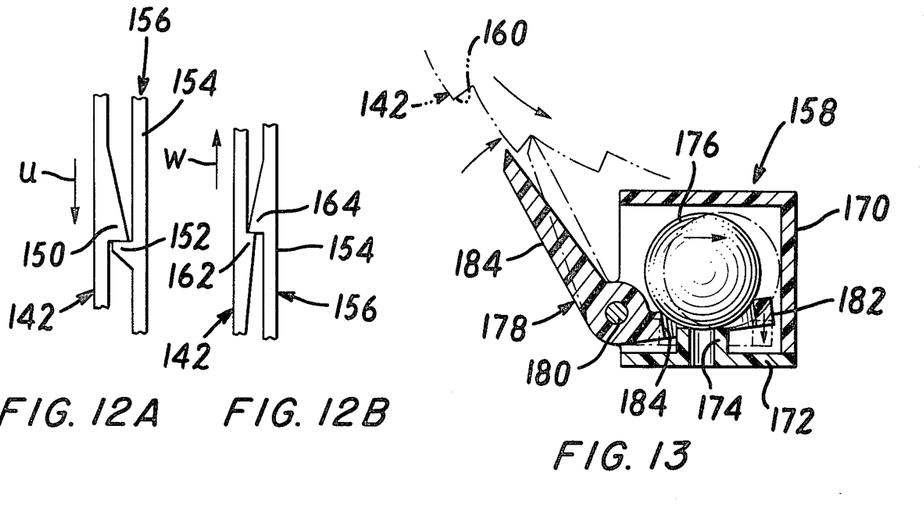
FIG. 12A is the fragmentary diagrammatic view of the ratchet teeth which lock the inertia wheel to the cap end portion against rotation of the inertia wheel in the belt pullout direction in the embodiment shown in FIGS. 5 to 11.
FIG. 12B is a diagrammatic view of the ratchet teeth which engage to ensure unlocking of the latching mechanism of the embodiment of FIGS. 5 to 12A.
FIG. 13 is a fragmentary side cross-sectional view of the inertia-detecting device of the embodiments of FIGS. 5 to 12B.
Figure 14:
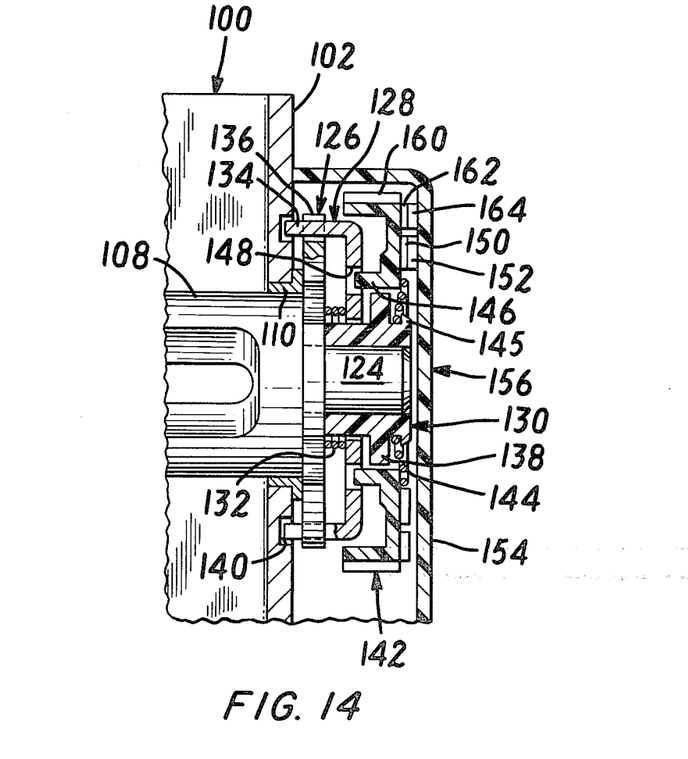
FIG. 14 is a partial end cross-sectional view of the latch assembly of the retractor shown in FIGS. 5 to 13 in the latched condition.

Inasmuch as the cam teeth 146 leave the cam slots 148 (FIG. 11), there is now introduced the problem of how to return the latching mechanism to the unlocked configuration shown in FIG. 10. That problem is solved by providing companion releasing ratchet teeth 162 and 164 on the outer face of the inertia disc 142 and the inner face of the wall portion 154, respectively. The releasing teeth 162 and 164 face in the opposite direction from the latching ratchet teeth 150 and 152 so that when they engage, they prevent the inertia wheel 142 from rotating in the belt unwinding direction U. The releasing ratchet teeth 162 and 164 are located in circular rows concentric to the locking ratchet teeth but are positioned circumferentially to engage at a position offset a small distance d from the position in which the locking ratchet teeth engage, the distance d being somewhat less than the small amount of rotation required for the latch teeth 134 to engage the locking shoulders 140a of the indentations 140 so that the camming action that occurs between the tips 134a of the latch teeth 134 and the surfaces 140b of the locking indentations 140 does not begin until after the releasing ratchet teeth 162 and 164 have engaged and stop the inertia wheel from rotating in the belt winding direction W. FIGS. 12A and 12B of the drawings show the operation of the locking ratchet teeth 150 and 152 and the releasing ratchet teeth 162 and 164 very clearly.

The embodiment of FIGS. 5 to 14 of the drawings also includes a different inertial sensing device 158 from that of FIGS. 1 to 4. The device 158 is highly sensitive, preferably in the range of 0.3 to 0.7 g. It includes a casing 170, the bottom wall 172 of which has an upwardly projecting, circular flange 174 which defines an annular seat for a spherical, inertially-responsive mass 176. A pawl 178 is attached to the case by a pivot pin 180 and includes a detector arm 182 having a hole 184 which is of such a size and shape as to permit the pawl 178 to pivot by gravity into the position shown in solid lines in FIG. 13 in which the locking tip portion 184' lies clear of the ratchet teeth 160 on the inertia wheel 142 as long as the mass 176 rests on the seat 174, which it will in the absence of acceleration of the assembly 158 above about 0.3 g. When the assembly 158 is accelerated—the term acceleration is used in the general sense of a change in velocity in any direction and, of course, includes deceleration—in excess of about 0.3 g the inertia of the mass 176 causes the mass to roll out of seat in a direction opposed to the predominant direction of acceleration of the assembly. When the mass 176 rolls up and out of the seat in any direction, it pushes down on the detecting portion 182 of the pawl 178, thereby pivoting the pawl about the pivot pin 180 and moving the locking tip portion 184' into position for engagement by one of the ratchet teeth 160 on the perimeter of the inertia wheel 142, as illustrated in phantom lines in FIG. 13. When the acceleration above the design threshold of the assembly 158 ceases, and assuming that the retractor is released from the locked condition by removal of force from the belt and slight rewinding of the belt onto the reel, the mass 176 rolls back into the seat, thereby allowing the pawl 178 to fall back to the position shown in solid lines in FIG. 13.

The dimensions of the casing and the design of the pawl are such that the mass 176 is prevented from rolling off the seat to a position from which it will not roll back into the seat after an acceleration to which it responds ceases. This is accomplished by limiting displacement of the mass in any direction to any distance somewhat less than the effective radius of the seat 174. The design of the inertia responsive assembly 158 should also take into account allowing for some inclination of the vehicle when it is parked so that the mass remains seated even though the seat may be somewhat inclined from the horizontal.

The mode of operation of the retractor shown in FIGS. 5 to 14 is essentially the same as the mode of operation of the embodiment shown in FIGS. 1 to 4, and those differences that exist have been described above in conjunction with the description of the structure.

Thus, the present invention provides a novel and improved emergency locking retractor of the double-safety type which uses relatively few components and can be manufactured on a mass production basis at low unit cost. The size and weight of the retractor are favorable to use in the small automobiles which are not only popular but economically necessary at the present and for the foreseeable future. The locking mechanism can employ many plastic parts, and no bulky large heavy castings of the type found in some presently known emergency locking retractors are used. The frame, reel, reel flange and latch disc must, of course, be strong and are, therefore, made of metal; the frame, flange and latch disc can be made as stampings from heavy gage metal sheet. The sleeve, inertia wheel, and the two covers of both embodiments can be of plastic, and all of the components, except for the mass, of the inertia-responsive devices can also be plastic. Retractors embodying the present invention are easy to put together in that the various parts are assembled end-wise one after the other without any intricate time-consuming assembly operations.

The above-described embodiments are exemplary, and numerous variations and modifications may be made by those skilled in the art without departing from the scope and spirit of the invention. All such variations and modifications are intended to be included within the scope of the invention, as defined in the appended claims.

I claim:

1. An emergency locking belt retractor comprising a frame having spaced-apart side members; a belt reel mounted between the frame side members for rotation, and having a shaft portion extending outwardly beyond one of the side members relative to the space between the frame members; a flange affixed on said shaft portion adjacent the side member and rotatable with the reel and having a multiplicity of circumferentially spaced-apart latch-receiving notches; a latch disc received on the shaft portion adjacent and outwardly of the flange, relative to the side frame member, for movement axially of the shaft portion toward and away from the flange and having a multiplicity of latch teeth extending inwardly through the flange latch-receiving notches; means on the said one side frame member defining locking shoulders corresponding to and selectively engageable by the latch teeth on the latch disc for selectively latching the reel to the side frame member by way of the reel flange when the latch disc is moved toward the reel flange; latch spring means for urging the latch disc axially away from the reel flange; an inertia wheel received on the shaft portion adjacent and outwardly of the latch disc, relative to the side frame member, for both rotation and axial movement on the shaft portion; cam means on the inertia wheel and latch disc for moving them axially of the shaft portion away from each other upon rotation of the latch disc in the belt unwinding direction relative to the inertia wheel; a member affixed to the retractor frame and having a wall portion adjacent and outwardly of the inertia wheel, relative to the frame; locking ratchet means on the inertia wheel and wall portion selectively engageable upon outward axial movement of the inertia wheel by the cam means for preventing rotation of the inertia wheel in the direction of belt unwinding; an inertia wheel spring urging the inertia wheel in a direction away from the wall portion, whereby the latch spring and inertia wheel spring normally urge the latch disc and inertia wheel toward each other for conjoint rotation with the latch teeth out of engagement with the latch shoulders on the frame side member but upon rapid acceleration of the reel in the belt-unwinding direction the inertia wheel lags behind the latch disc and is cammed outwardly by the cam means and locked to the wall portion against rotation, whereupon the latch disc is cammed away from the inertia wheel toward the frame side member and the latch teeth lock to the latch shoulders on the frame side member to prevent further unwinding of the belt reel; a circumferential row of spaced-apart ratchet teeth on the inertia wheel having shoulders facing in the direction of belt unwinding rotation; pawl means selectively engageable with any one of the ratchet teeth; and inertia sensing means responsive to an abrupt change in the velocity of the retractor for engaging the pawl means with a ratchet tooth, whereby the inertia wheel ceases to rotate with the latch disc and reel and is cammed axially outwardly toward the wall portion, whereupon the latch disc is cammed toward the frame side member to engage the latch teeth with the latch shoulders and stop rotation of the reel in the belt unwinding direction.

2. A retractor according to claim 1 wherein the inertia wheel spring generates a force substantially less than the force generated by the latch spring so that when the latch disc rotates relative to the inertia wheel, the inertia wheel shifts outwardly toward the wall portion before the latch disc is cammed inwardly toward the side frame member to latch the reel against rotation.

3. A retractor according to claim 1 or claim 2 wherein the cam means comprises a circular row of circumferentially spaced-apart cam slots on one of the latch disc and inertia wheel and cam teeth having camming edges oblique to the plane of rotation of the tips thereof on the other of the latch disc and inertia wheel, each cam tooth being received in a slot with the cam edge working against an end of the slot to cam the latch disc and inertia wheel apart when the latch disc rotates in the belt-unwinding direction relative to the inertia wheel.

4. A retractor according to claim 1 or claim 2 wherein the locking ratchet means includes circular rows of circumferentially spaced-apart, mutually engageable locking ratchet teeth on facing surfaces of the inertia wheel and the wall portion.

5. A retractor according to claim 1 or claim 2 wherein said cam means ceases to move the latch disc and inertia wheel apart when the axial spacing between them reaches a predetermined dimension.

6. A retractor according to claim 5 and further comprising mutually engageable releasing ratchet means on the facing surfaces of the inertia wheel and the wall portion for stopping the inertia wheel from rotating in the belt winding direction when the retractor locks and then is to be unlocked by rewinding of the belt.

7. A retractor according to claim 3 wherein the maximum axial dimensions of the cam teeth are such that they emerge from the cam slots in the latch disc and ride on radially-planar surfaces of the latch disc when the spacing between the latch teeth and locking ratchet teeth is substantially equal to the axial spacing of the wall portion from the base portions of the locking shoulders on the frame side member so that the axial camming action of the cam means ceases even though additional rotation of the latch disc may be required to engage the latch teeth to the locking shoulders.

8. A retractor according to claim 7 and further comprising mutually engageable releasing ratchet means on the inertia wheel and wall portion for stopping rotation of the inertia wheel in the belt winding direction to ensure that after locking the latch disc rotates relative to the inertia wheel in the winding direction when the belt begins to rewind and the cam teeth re-enter the cam slots.

9. A retractor according to claim 4 wherein the number and angular spacing of the locking shoulders on the frame side member are equal to the number and angular spacing of the locking ratchet teeth on the inertia wheel and the locations of the locking shoulders and locking ratchet teeth are circumferentially offset in accordance with the rotational period of the cam means to ensure register of the latch teeth with the locking shoulders when the inertia wheel is locked to the wall portion.

10. A retractor according to claim 1 or claim 2 wherein the locking shoulders are defined by end walls facing against the belt unwinding direction of indentations in the frame side members, and each indentation includes a oblique camming base portion adapted to cam a latch tooth it receives out of the indentation upon rotation of the latch disc in the belt winding direction.

11. A retractor according to claim 1 or claim 2 wherein the inertia means includes a mass which rests stably on a support surface in the absence of a acceleration of such surface above a predetermined value but which moves from the stable position in response to such acceleration and moves the pawl means into a position to engage a ratchet tooth on the inertia wheel.

12. A retractor according to claim 11 wherein the mass rests on a flat surface and tips about a circular edge to lift a portion of the pawl means to engage it with a ratchet tooth.

13. A retractor according to claim 11 wherein the mass is spherical and rests on a circular annular surface from which it rolls in response to such acceleration to engage and move the pawl.

* * * * *